(12) United States Patent
Kan et al.

(10) Patent No.: US 9,720,883 B2
(45) Date of Patent: *Aug. 1, 2017

(54) MULTI-LEVEL ARCHITECTURE FOR IMAGE DISPLAY

(71) Applicant: Amazon Technologies, Inc., Seattle, WA (US)

(72) Inventors: Chi Ming Kan, Seattle, WA (US); Ares Sakamoto, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 444 days.

This patent is subject to a terminal disclaimer.

(21) Appl. No.: 14/538,749

(22) Filed: Nov. 11, 2014

(65) Prior Publication Data
US 2016/0055129 A1    Feb. 25, 2016

Related U.S. Application Data

(63) Continuation of application No. 11/963,651, filed on Dec. 21, 2007, now Pat. No. 8,930,835, which is a continuation of application No. 11/771,983, filed on Jun. 29, 2007, now Pat. No. 8,635,537.

(51) Int. Cl.
| | |
|---|---|
| *G06F 3/048* | (2013.01) |
| *G06F 17/21* | (2006.01) |
| *G06Q 20/32* | (2012.01) |
| *G06Q 30/06* | (2012.01) |
| *G06Q 30/02* | (2012.01) |
| *H04L 29/06* | (2006.01) |
| *G06Q 10/10* | (2012.01) |

(52) U.S. Cl.
CPC ........... *G06F 17/212* (2013.01); *G06Q 20/32* (2013.01); *G06Q 30/0277* (2013.01); *G06Q 30/0601* (2013.01); *H04L 67/42* (2013.01); *G06F 3/048* (2013.01); *G06Q 10/10* (2013.01)

(58) Field of Classification Search
CPC ....................................................... G06F 3/048
USPC ......................................................... 715/764
See application file for complete search history.

(56) References Cited

U.S. PATENT DOCUMENTS

| | | | |
|---|---|---|---|
| 5,681,674 | A | 10/1997 | Fujimoto |
| 6,023,714 | A | 2/2000 | Hill et al. |
| 6,028,583 | A | 2/2000 | Hamburg |
| 6,049,778 | A | 4/2000 | Walker et al. |
| 6,222,559 | B1 | 4/2001 | Asano et al. |
| 6,334,110 | B1 | 12/2001 | Walter et al. |
| 6,356,281 | B1 | 3/2002 | Isenman |
| 6,484,149 | B1 | 11/2002 | Jammes et al. |
| 7,120,632 | B2 | 10/2006 | Helmbrecht et al. |

(Continued)

FOREIGN PATENT DOCUMENTS

WO    WO 2004/102520 A1    11/2004

*Primary Examiner* — William Titcomb
(74) *Attorney, Agent, or Firm* — Knobbe, Martens, Olson & Bear, LLP

(57) ABSTRACT

A system and method for providing the dynamic display of content and related advertisements are provided. The advertisements are displayed based on predetermined customer types. A network resource, such as Web page, can include a plurality of dynamic content modules. Depending on the available display area and additional display criteria, each dynamic content module displays a subset content and related advertisements. Each dynamic content module corresponds to an integration of multiple layers of content, such as text, graphics, and image rendering information.

20 Claims, 7 Drawing Sheets

(56) References Cited

U.S. PATENT DOCUMENTS

| | | |
|---|---|---|
| 7,133,559 B2 | 11/2006 | Yamazaki |
| 7,249,060 B2 | 7/2007 | Ling |
| 7,260,783 B1 | 8/2007 | Mika |
| 7,287,220 B2 | 10/2007 | Kaasila et al. |
| 7,345,688 B2 | 3/2008 | Baudisch et al. |
| 7,366,721 B1 | 4/2008 | Bennett et al. |
| 7,373,321 B2 | 5/2008 | Collings et al. |
| 7,379,976 B2 | 5/2008 | Huat |
| 7,392,483 B2 | 6/2008 | Wong et al. |
| 7,429,993 B2 | 9/2008 | Hui |
| 7,543,242 B2 | 6/2009 | Goossen et al. |
| 7,596,536 B2 | 9/2009 | Tzruya et al. |
| 7,620,905 B2 | 11/2009 | Boss et al. |
| 7,644,369 B2 | 1/2010 | Hoe-Richardson |
| 7,647,299 B2 | 1/2010 | Harik |
| 7,685,117 B2 | 3/2010 | Gross |
| 7,827,494 B1 | 11/2010 | Hedayatpour et al. |
| 7,895,522 B2 | 2/2011 | Wong et al. |
| 7,930,206 B2 | 4/2011 | Koningstein |
| 7,954,064 B2 | 5/2011 | Forstall et al. |
| 7,996,786 B2 | 8/2011 | MacLaurin et al. |
| 8,154,473 B2 | 4/2012 | Engel et al. |
| 8,200,535 B1 | 6/2012 | Reddin et al. |
| 8,255,513 B2 | 8/2012 | Assa |
| 8,271,025 B2 | 9/2012 | Brisebois et al. |
| 8,348,155 B2 | 1/2013 | Wollbrand et al. |
| 8,483,752 B2 | 7/2013 | Brisebois et al. |
| 2001/0019336 A1 | 9/2001 | Gordon et al. |
| 2001/0037359 A1 | 11/2001 | Mockett et al. |
| 2002/0085035 A1 | 7/2002 | Orbanes et al. |
| 2002/0152118 A1 | 10/2002 | Hadjigeorgis |
| 2002/0156839 A1 | 10/2002 | Peterson et al. |
| 2002/0194226 A1 | 12/2002 | Sheth et al. |
| 2003/0067556 A1 | 4/2003 | Cormie |
| 2003/0126146 A1 | 7/2003 | Van Der Riet |
| 2004/0181749 A1 | 9/2004 | Chellapilla et al. |
| 2004/0239703 A1 | 12/2004 | Angelica |
| 2005/0180645 A1 | 8/2005 | Hasegawa et al. |
| 2005/0210400 A1 | 9/2005 | Hoe-Richardson |
| 2005/0289018 A1 | 12/2005 | Sullivan et al. |
| 2006/0036955 A1 | 2/2006 | Baudisch et al. |
| 2006/0230100 A1 | 10/2006 | Shin et al. |
| 2007/0046694 A1 | 3/2007 | Aizikowitz et al. |
| 2007/0157110 A1 | 7/2007 | Gandhi et al. |
| 2007/0157118 A1 | 7/2007 | Wuttke |
| 2007/0234212 A1 | 10/2007 | de Souza et al. |
| 2007/0252804 A1 | 11/2007 | Engel et al. |
| 2007/0276720 A1 | 11/2007 | Lu et al. |
| 2008/0126370 A1 | 5/2008 | Wang |
| 2008/0140524 A1 | 6/2008 | Anand et al. |
| 2008/0221987 A1 | 9/2008 | Sundaresan et al. |
| 2008/0270248 A1 | 10/2008 | Brill |
| 2008/0297670 A1 | 12/2008 | Tzschoppe et al. |
| 2009/0030976 A1 | 1/2009 | Shukla et al. |
| 2009/0171754 A1 | 7/2009 | Kane et al. |
| 2009/0171755 A1 | 7/2009 | Kane et al. |
| 2009/0171968 A1 | 7/2009 | Kane et al. |
| 2009/0172021 A1 | 7/2009 | Kane et al. |
| 2009/0172551 A1 | 7/2009 | Kane et al. |
| 2009/0241043 A9 | 9/2009 | Balthaser |
| 2009/0249393 A1 | 10/2009 | Shelton et al. |
| 2011/0125561 A1 | 5/2011 | Marcus |
| 2011/0191372 A1 | 8/2011 | Kaushansky et al. |
| 2012/0271884 A1 | 10/2012 | Holmes et al. |
| 2013/0073400 A1 | 3/2013 | Heath |

MULTI-LEVEL ARCHITECTURE FOR IMAGE DISPLAY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. §1.57.

BACKGROUND

Generally described, the ubiquity of graphical user interfaces (GUI) and communication networks, such as the World Wide Web, have promoted the success of e-commerce and online transactions. The availability of network-based resources, such as Web sites, to consumers has made shopping more convenient and less costly by reducing the need to commute to physical stores to purchase goods and services. For example, by means of a Web browser, a user can shop for many different goods and services. For businesses, goods and services can be offered to customers across the town, across the country, or across the world.

At the same time that e-commerce provides added opportunities for businesses, it also creates new competition. Consumers are no longer limited in what they can buy by geographic location. As such, the user experience of an online service becomes of paramount importance. Consumers are, for example, more likely to shop at Web sites where product and service information are provided more conveniently and are more relevant to what the consumer is seeking.

From the point of view of businesses, providing a Web site which enhances user experience and reduces cost of development and maintenance to the business can be an important consideration. Traditionally, commercial Web sites have built individual static Web pages that include such product and service information. Such static Web pages are updated as new information becomes available or new products/services are offered to customers. For example, if an item is offered as part of a promotion, the Web page featuring that item is manually updated to reflect the new information. Such manual or semi-manual updates to Web pages are expensive and time consuming.

In addition to the dynamic nature of advertising and promotion of products/services, consumers have a wide variety of devices that they can use to browse different Web sites and shop for goods and services. For example, consumers can also view content from a wide variety of computing device displays that offer varied sizes for rendering content. Additionally, personal digital assistants (PDA), smart mobile phones, television set-top boxes, and a variety of other digital equipment may now be used to browse the content stored on remote devices and purchase goods and services. Static content is optimized to be displayable of many different available displays, often with a focus on ensuring that the entire content can be displayed on smaller sized display. Thus, the static content, especially advertising content which needs to be changed often due to the dynamic nature of advertising, is often displayed with additional unused "white space" for displays that have more available display area.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
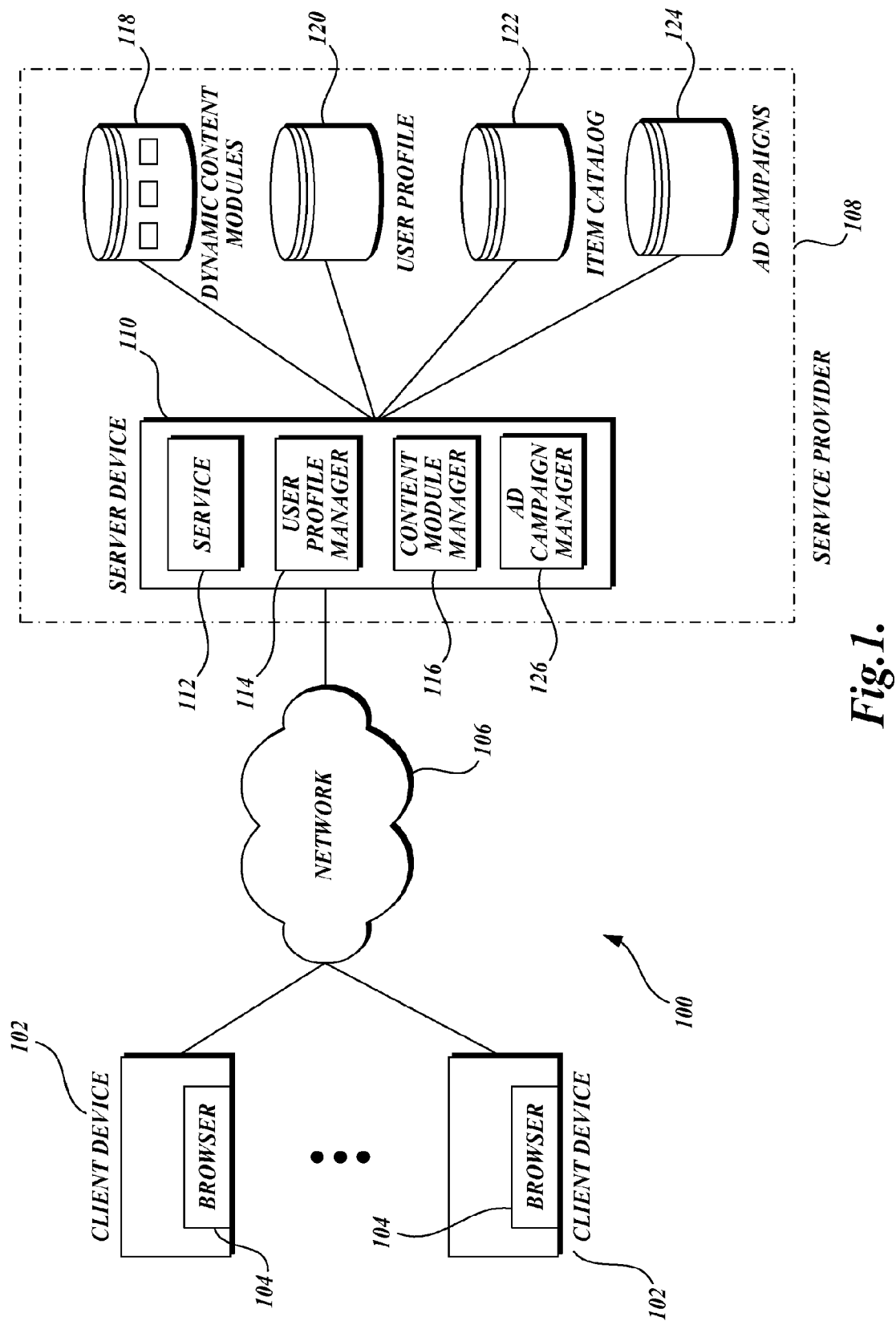
FIG. 1 is a block diagram depicting an illustrative client-server operating environment suitable for the display on content to consumers.

Generally described, the embodiments of the disclosure relate to the display of content on a client's device in a client-server computing environment. Specifically, the embodiments relate to the dynamic display of content on a client computing device by adjusting the selection of the displayed content according to available display size. In accordance with an illustrative embodiment of the invention, a client device initially transmits a content request to a service provider including a server device. In response to receiving the client's content request, the service provider retrieves user profile information from a user profile data store coupled with the server device. Based on the user profile information, the service provider generates a prioritized list of dynamic content modules according to advertisement campaign processing rules stored in the advertisement campaign date store. The service provider then selects and retrieves a number of content-scalable dynamic content modules from a dynamic content data store coupled with the server device. Subsequently, the service provider returns the content-scalable dynamic content modules to the client device for display as part of the requested content.

In an illustrative embodiment, the content-scalable dynamic content modules include multi-layered content that may be selected and automatically adjusted for the size of the display of the client device allocated to the content-scalable dynamic content module. The multi-layered content of the content-scalable dynamic content module includes processing logic that facilitates a client-side determination of fitting content into the allocated area of display by reducing or increasing the amount of content included in the display area. This is in contrast to merely scaling the size of the font or image while maintaining the same amount of content. The allocation of display area to the content-scalable dynamic content module may be based on the size of the display on the client device or display area consumed by other content on the display. For example, a mobile telephone or a PDA has more limited display area than a laptop computer to allocate for display of content-scalable dynamic content module.

In a further illustrative embodiment, the content-scalable dynamic content modules can include tabbed sections, each section being associated with displaying dynamic content modules associated with different consumer categories, such as early adopters, bargain hunters, and the like. These consumer categories are also known in the art as customer types. Other sections within the content-scalable dynamic content module can include promotional information, educational information, buying guides, priority messaging to a user (e.g., warning and updates), a chat interface, a product item finder (e.g., a search interface or a category browse interface, among others), as well as related item information associated with a particular consumer category. Although specific examples of the types of media content that might be displayed within the content-scalable dynamic content module have been discussed herein for illustration purposes, it should be understood that embodiments are not limited, and other possible media content could be displayed within the content-scalable dynamic content module.

The following detailed description describes illustrative embodiments of the invention. Although specific operating environments, system configurations, user interfaces, and flow diagrams may be illustrated and/or described, it should be understood that the examples provided are not exhaustive and do not limit the invention to the precise forms and embodiments disclosed. Persons skilled in the field of computer programming will recognize that the components and process elements described herein may be interchangeable with other components or elements or combinations of components or elements and still achieve the benefits and advantages of the invention. Although the present description may refer to the Internet, persons skilled in the art will recognize that other network environments that include local area networks, wide area networks, and/or wired or wireless networks, as well as standalone computing environments, such as personal computers, may be suitable. In addition, although the below description describes a client-server architecture, those skilled in the art will recognize that the invention may be implemented in a peer-to-peer network as well.

Prior to discussing the details of the various embodiments of the disclosure, it will be appreciated by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following descriptions, numerous specific details are set forth in order to provide a thorough understanding of the various embodiments of the disclosure. However, it will be apparent to one skilled in the art that the embodiments may be practiced without some or all of these specific details. In other instances, well known process elements have not been described in detail in order not to unnecessarily obscure various aspects of the disclosed embodiments.

FIG. 1 is a block diagram depicting a sample client-server operating environment 100 suitable for online shopping and browsing. Client devices 102 are coupled to the service provider 108 via a network 106. In one illustrative embodiment, the network 106 is the Internet and the client devices 102 communicate with the service provider 108 via Web protocols such as the HTTP (HyperText Transport Protocol). In this embodiment, the service provider 108 includes server devices 110 which may be arranged as Web servers in a server forum accessible to the name URL (Uniform Resource Identifier). In a Web environment, the client devices 102 generally search for documents using a query statement and the server devices 110 find documents that match the query and return Web pages to the client devices 102, which are displayed in a Web browser on the client device 102. In another illustrative embodiment, for example, in a corporate environment, the network 106 may be a LAN (Local Area Network). The service provider 108 may offer a number of services to the client devices 102, such as FTP (File Transfer Protocol), database access services, file access services, application services, etc. In one embodiment, the client's request may be for data, such as Web pages, to be returned to the client 102 by the service provider 108. Client devices 102 may include, but are not limited to, a personal computer, a personal digital assistant (PDA), a mobile phone device, a television set-top box, etc. In one illustrative embodiment, the client device 102 may include a Web browser 104 for interacting with the service provider 108 using Web protocols.

With continued reference to FIG. 1, the service provider 108 may include one or more server devices 110 including services 112, such as Web page services, a user profile manager 114, and a content module manager 116. The service provider 108 may further include an item catalog data store 122 coupled with the server device 110. The item catalog data store may include a database, an indexed search file, or other types of binary or textual files. The service provider 108 further includes a user profile data store coupled with the server device 110. The user profile is generally used to store information about user preferences and transaction history. For example, a user profile may include information indicating the likelihood of a particular user to purchase a particular type of item. The service provider 108 also includes an advertising campaign data store 124 which includes information corresponding to various advertisement campaigns managed by the service provider. One skilled in the relevant art will appreciate that advertisement campaign information can include selection information (such as user profile criteria for displaying selected content), displaying information regarding how to display selected content, service level information (such as the number of contractually agreed impressions, frequency of display), and the like. For example, the information stored in the ad campaign data store 124 may be rules which are applied to the user profile information to select what content, such as which dynamic content modules, will be presented to the user associated with the user profile information. An ad campaign manager 126 retrieves and uses the information from the ad campaign data store 124, in conjunction with the user profile manager 114 to generate a prioritized set of dynamic content modules that may be displayed in response to the content request. The service provider 108 may also include a dynamic content modules data store to store preconfigured content-scalable dynamic content modules. The preconfigured content-scalable dynamic content modules may be configured based on information in the item catalog data store and the user profile data store.

Figure 2:
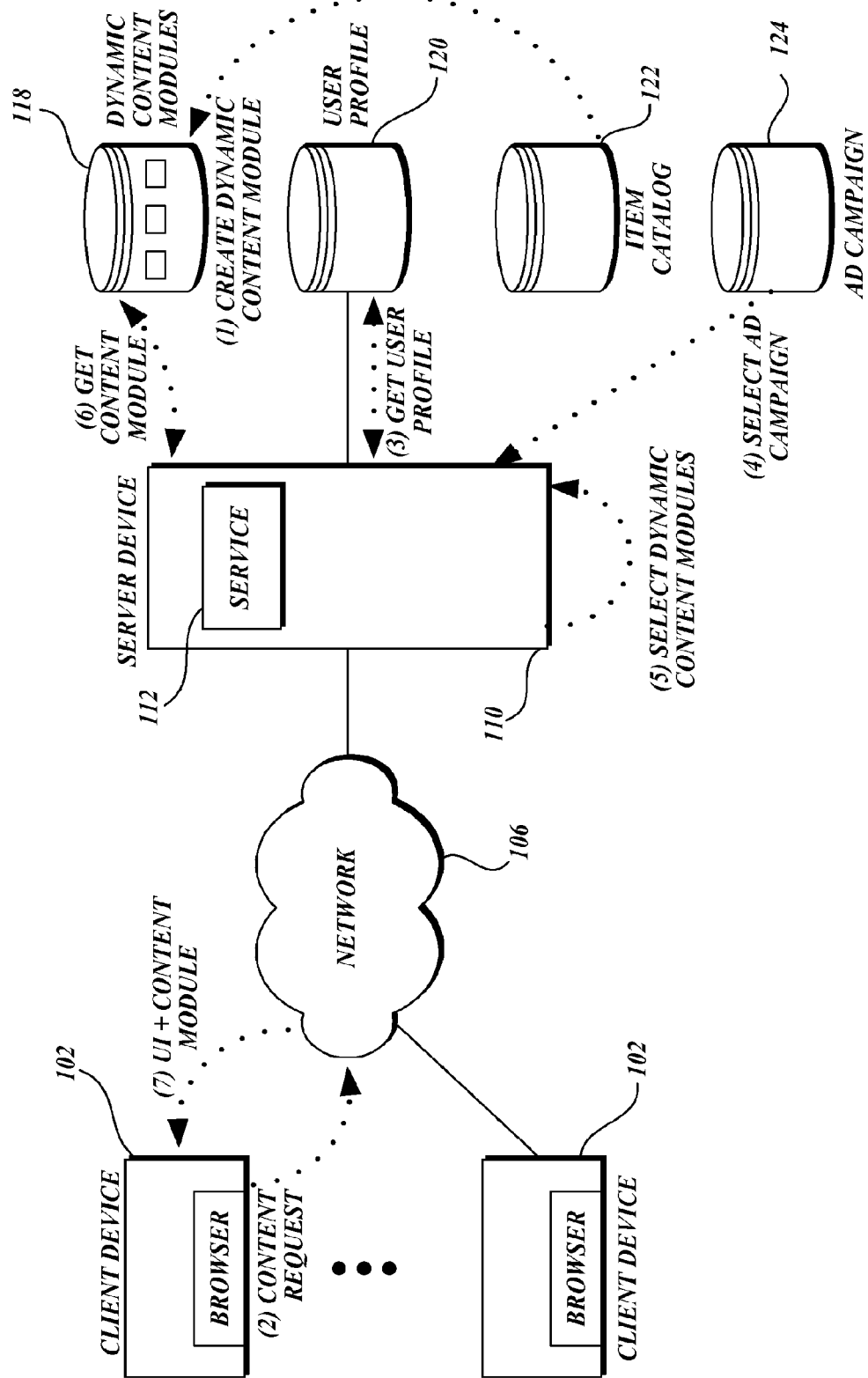
FIG. 2 is a block diagram of the client-server operating environment of FIG. 1 illustrating the processing of client content requests by a service provider.

FIG. 2 illustrates request routing in the client-server operating environment of FIG. 1. With reference to FIG. 2, the client device 102 sends a content request, via network 106, to server device 110 included in the service provider 108. As noted above, the content-scalable dynamic content modules may be preconfigured and stored in the dynamic content modules data store 118 based on information included in the item catalog data store 122 and the user profile data store 120. Upon receipt of the client content request, user profile manager 114 retrieves user profile information from the user profile data store 120 and provides the user profile information to the content module manager 116. The ad campaign manager 126 retrieves ad campaign information from the ad campaign data store 124. The ad campaign manager 126 and the user profile manager 114 collaborate to apply the rules obtained from the ad campaign data store 124 to the data obtained from the user profile data store 120. In an illustrative embodiment, the ad campaign manager 126 can first utilize high level item categories (e.g., electronics, movies, sporting goods, etc.) associated with the user profile information to select a subset of advertisement campaigns generally applicable to the identified item categories. The ad campaign manager 126 then sorts the subset of advertisement campaigns according to applicability to various types of consumer types. For example, the ad campaign manager 126 may sort the subset of advertisement campaigns to identify all advertisement campaigns that apply to early adopters, bargain hunters, etc. The ad campaign manager 126 can then utilize the user profile information to prioritize advertisement campaigns within each consumer type. In an illustrative embodiment, the content modules may be prioritized and/or selected based on user demographic information (e.g., address information), user activity (e.g., previous purchases), and other additional data.

The content module manager 116 subsequently retrieves a number of content-scalable dynamic content modules from the dynamic content modules data store 118. The dynamic content modules may be generated at the time of request. Alternatively, some or a portion of the dynamic content modules may be pre-generated. Subsequently, the service 112 returns the content-scalable dynamic content modules to the client device 102 to be displayed in the browser component 104.

Although the above descriptions and the detailed descriptions that follow may refer to a Web browser and Web server, it will be appreciated by those skilled in the art that the embodiments of the present disclosure are not limited to a Web environment. The techniques and systems described are equally applicable to other kinds of computing environments, such as LANs and WANs (Wide Area Network) and any other client-server or peer-to-peer computing environment.

Figures 3A, 3B:
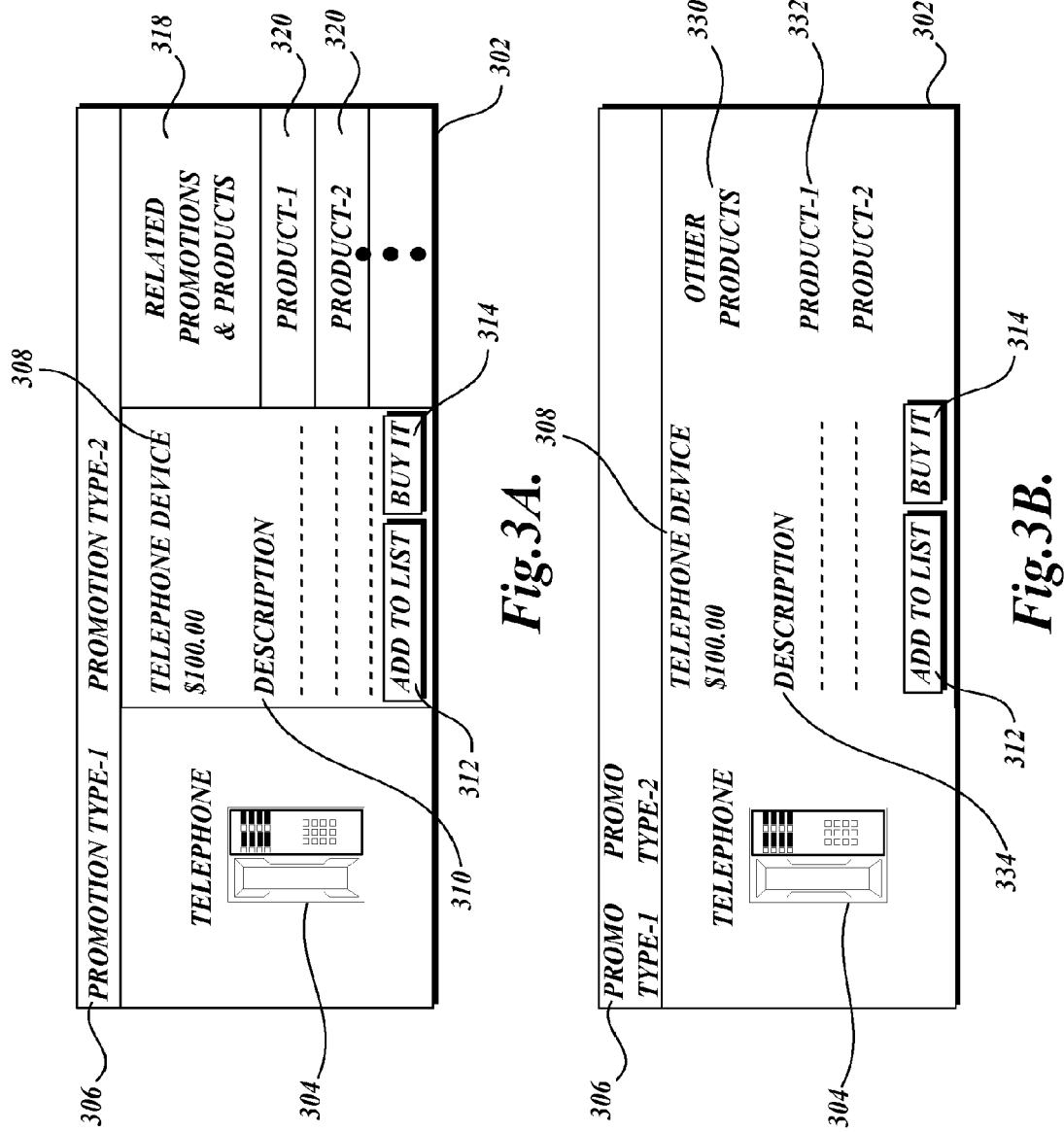
FIG. 3A is a block diagram of a content-scalable dynamic content module for displaying content to consumer in accordance with an aspect of then invention.
FIGS. 3B and 3C are block diagrams of the content-scalable dynamic content module of FIG. 3A illustrating the adjustment of the display of content for smaller available display sizes.

FIGS. 3A-3E illustrate the content-scalable dynamic content modules. With reference to FIG. 3A, in one illustrative embodiment, the content-scalable dynamic content module includes several distinct sections. In one area, different types of products and/or service promotions are displayed. For example, one type of promotion may be "deals of the day" which may indicate special pricing for selected products and/or services offered for the current day. Another type of promotion may include promotion of items with a rebate item. Yet another type of promotion may include general promotions of various products and/or services. Each of these different types of promotions 306 may be attractive to a different category of consumers. For example, some consumers may prefer shopping for items which are value priced under deals of the day types of promotions. While other consumers may prefer buying an item now for a higher price and getting cash rebates later. As such, this configuration of the content-scalable dynamic content module provides information about products and services to consumers with different interests, increasing the size of the market for the business providing such content-scalable dynamic content modules.

The content-scalable dynamic content module may include a section for a selected item 304, in one illustrative embodiment. In this embodiment, another section 310 provides other information relating to the main item 304, such as name of the item, price, and a short description. Various control buttons such as a button 312 for adding items to a shopping list and instant purchase button 314, among others, may also be provided in the same area 310.

The content-scalable dynamic content module may include other sections 318 and 320 for providing promotional information about the main selected item 304 and related products which may be of interest to the consumer. For example, a consumer looking for a telephone device 304 is presented with the brand name of the device 308, the price of the telephone device, and a description 310 of the main item. Related promotions and products may include other telephone devices in the same price range and/or by the same manufacturer. Additionally, related products 320 may include items which are not the same as the main item but are related to the main item 304. For example, for the telephone device 304, a related product such as an answering machine may be listed in the related products section 320. As noted above, consumers may use different devices to search online and shop for products and services. For example, a PDA may be used for browsing the Web. The content-scalable dynamic content module may not fit in the display area of a PDA in its full form, requiring adjustment of the information included therein.

With reference to FIG. 3B, the content-scalable dynamic content module 302 adjusts the display of content to fit in a display area allocated to display the content-scalable dynamic content module 302. The content-scalable dynamic content module 302 adjusts the contents therein by reducing or increasing the amount of information displayed. For example, the description section 334 of the selected item 304 may be reduced to two lines of text instead of three lines of text as shown in description 310 in FIG. 3A, in order to fit the information in the allocated display area. Similarly, the information displayed about related products in area 332 may be reduced compared with the information displayed about the same related products in the larger display area 320 shown in FIG. 3A. Additionally, other content, such as various labels and descriptions, may be reduced in terms of amount of information displayed. For example, related promotions and products 318 shown in FIG. 3A may be reduced to "other products" 330 as shown in FIG. 3B.

In one illustrative embodiment, the content-scalable dynamic content modules include executable code to perform functions needed to determine content to be displayed according to the display area allocated for displaying requested content, as discussed above. For example, the executable code may be implemented using client-side scripts, such as DHTML (Dynamic Hyper Text Markup Language), JavaScript, Jscript, and the like. Those skilled in the art will appreciate that client-side executable code can operate independently of the server. Client-side code can also communicate with server-side scripts, such as ASP.Net, or other server-side executable code to get additional information and data as needed. The client-side code corresponds to also process display rules for determining which content will be displayed according to the display area allocated to the requested content and how the content will be displayed. For example, display rules may indicate that at some threshold value corresponding to a certain display area size, the content must be displayed differently or some portion of content will not be displayed. Each layer within a multi-layer dynamic content module may have its own independent set of display rules. Alternatively, two or more layers within a multi-layer dynamic content module may have the same or substantially the same set of display rules. In one illustrative embodiment, the display rules are embedded as logic in the client-side code. In another illustrative embodiment, the rules may be implemented differently. For example, the client-side code may include a rule-processing engine that processes rules obtained from the server. Such rules may be implemented and stored on the server device 110 in the form of data for processing by the rule-processing engine.

Figure 3C:
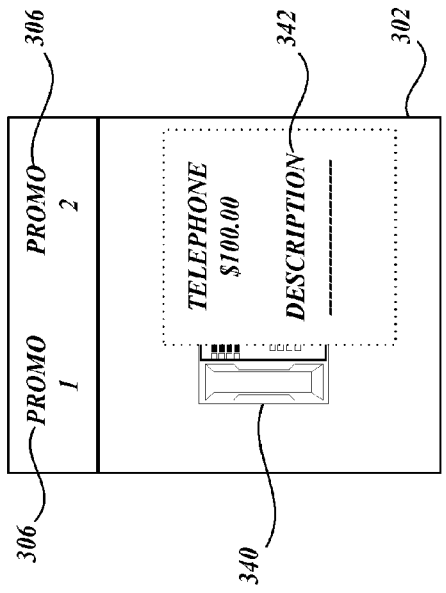

FIG. 3C illustrates a minimal version of the content-scalable dynamic content module having only enough information to identify the main item selected 340 and other basic information such as brand name, price, and a very short description 342. This approach eliminates the need for horizontal and vertical scrolling of content to look at different portions of the information. In one illustrative embodiment, when display area available is minimal, the displayed content may be changed completely to show a more compact version of the content. For example, instead of showing an image of the product 340 and a description 342, a different image of the same product may be shown as a "teaser" image to encourage the consumer to seek further information about the displayed content.

Figure 3D:
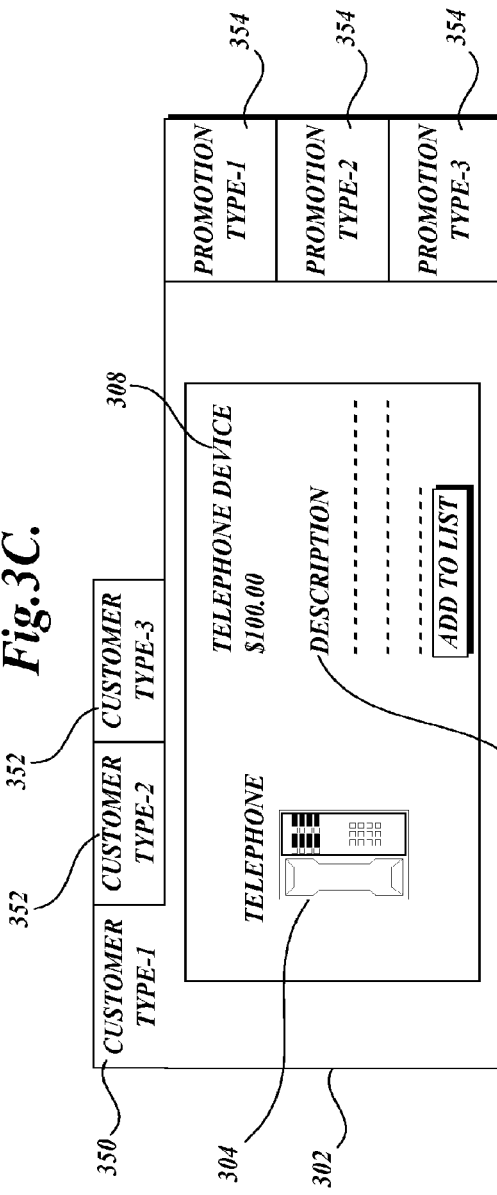
FIG. 3D is a block diagram of a content-scalable dynamic content module with tabbed sections in full form.

FIG. 3D illustrates another aspect of the content-scalable dynamic content module including grouping of information with respect to various categories of consumers and types of promotions associated with each category of consumer. In one illustrative embodiment, selectable tabs 350 are provided for a variety of possible customer types 352. For example, consumer and/or customer types may include "deal hunters," "early adopters," and "browsers," among other possible consumer types. Deal hunters include consumers primarily concerned with the price of merchandise and services and seek the best values they can find. Early adopters include consumers that are eager to learn about and/or buy newly introduced products and services. Browsers include consumers who do not seek any product or service in particular but browse Web sites for any product or service that might interest them. Different types of promotions 354 may be associated with different types of consumers 352. For example, consumers who are deal hunters may be associated with promotions including "deals of the day," "rebate items," and "general promotions." A consumer included in the early adopters consumer category may be associated with promotions such as "pre-release," "just arrived," and "top sellers" among other types of possible promotions. A pre-release promotion type includes items which have not been officially introduced to the market, early versions of which are available to be purchased. The just arrived type of promotion includes items that have just been introduced and are available for sale. The top sellers type of promotional items includes items which have been purchased by a greater number of consumers compared to other similar items. Consumers included in the browser consumer category may be similarly associated with promotion types such as "shop by," "items suggest," and "products explorer." The shop by promotion type includes items that are classified according to some criterion such as price range, brand name, or other criteria. The items suggest promotion category includes items which are suggested by the service provider based on the user profile. For example, if the user has previously purchased sports-related items from the service provider, the service provider may suggest sports-related items, such as sportswear, sports equipment, sports magazines, etc. The products explorer type of promotion includes lists of products arranged in an easy-to-explore manner such as a tree structure, a list structure, etc. For example, the service provider 108 may provide the consumer in the browser category an index of all items available arranged according to broad categories such as electronics, sports, books, etc. Regardless of the customer type selected, in some embodiments, the promotions that fall into the particular shopper type category can be personalized for display based on the user profile. That is, the promotions selected for display can be selected not only by customer type, but can also be personalized for the user within those promotions selected for a particular shopper type.

Figure 3E:
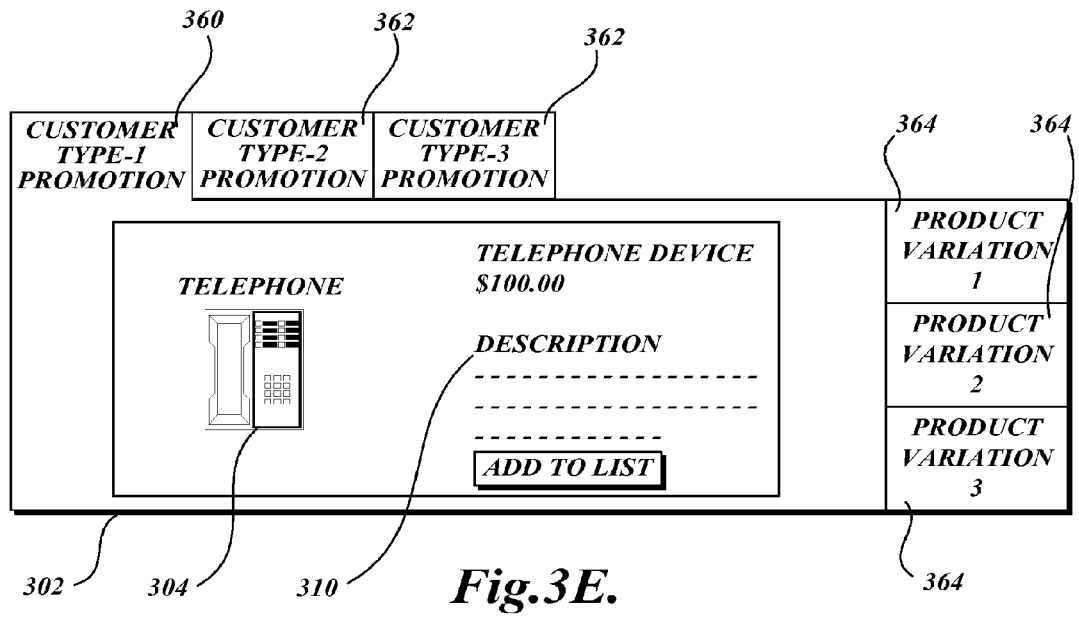
FIG. 3E is a block diagram of a content-scalable dynamic content module for displaying content to consume illustrating tabbed sections showing customer types and product variations.

FIG. 3E illustrates a content-scalable dynamic content module 302 showing tabbed promotions 360 and 362 for a particular consumer category 350. In one illustrative embodiment, a section 364 of the content-scalable dynamic content module 302 may include products which are variations of the main item selected 304. For example, if the main item is a telephone device 304, a product variation 364 may be another telephone device with similar features to telephone device 304. Product variations 364 are in the same promotion category as indicated by the promotion type 360. For example, if the promotion type 360 IS "rebate items," then product variations listed in section 364 of the content-scalable dynamic content module 302 includes only product variations which include a rebate item. The promotion types 360 and 362 are associated with a particular consumer category, as indicated above. For example, if the consumer category is "early adopters," then the tabbed promotion types 360 and 362 would include promotion types "pre-release," "just arrived," and "top sellers."

Now, with reference to FIGS. 3D and 3E, the content-scalable dynamic content module is configured to periodically change items displayed in the promotion section 354 and product variations section 364 to increase exposure of the consumer to different promotions and products. The items listed in the promotion section 354 and product variations section 364 may be changed based on user profile and newly introduced products previously not available. For example, if the consumer category is "deal hunter," and rebate items are listed in the product variation area 364, then the rebate items displayed will be changed periodically to expose the consumer to available promotional items with rebates. Additionally, if a new promotional item with rebate becomes available, then such new promotional item with rebate will be displayed in the product variation area 364. Similarly, the information displayed based on customer types 352 in tabs 350 may be periodically changed to provide other customer types 352 with product and promotion information of interest to the other customer types. Such rotation of product information and promotion based on customer types 352 and corresponding promotion types displayed in area 354 provide extensive exposure of various products to many types of customers with many different interests, increasing the likelihood of sales of products included in the promotions.

In one illustrative embodiment, the promotions displayed in area 354 are prioritized according to the rules obtained from the ad campaign data store 124. For example, a rule from the campaign may indicate that the promotion products with the highest price must be displayed at the top of the display area, or be displayed for the longest time before being replaced by another promotion in the course of rotation of promotions, as discussed above.

Figure 4:
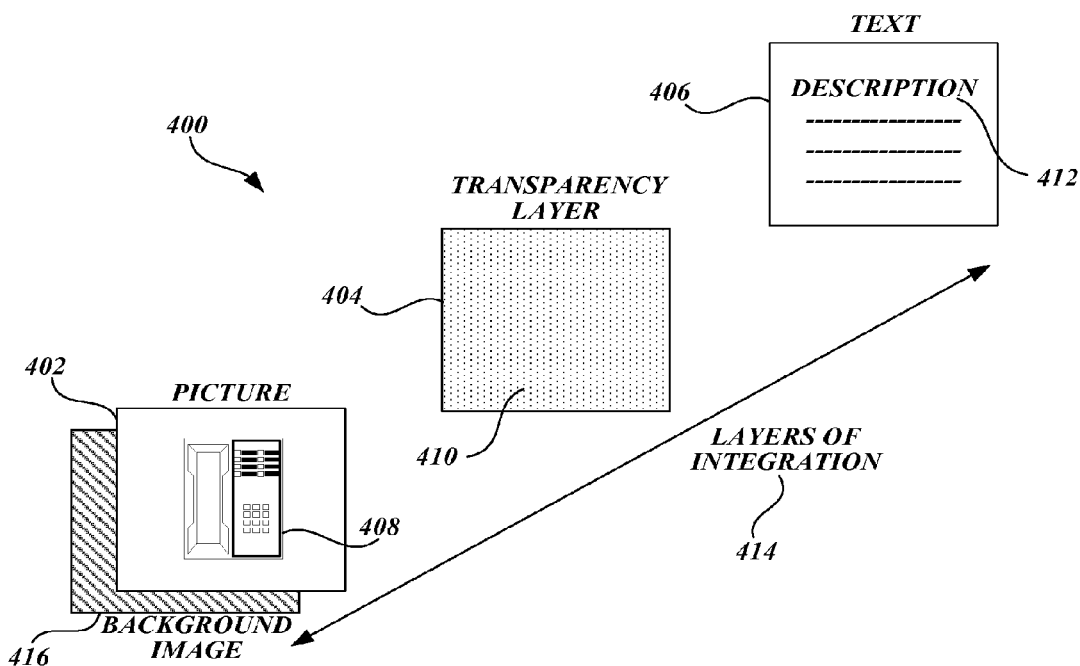
FIG. 4 is a block diagram of a content-scalable dynamic content module illustrating the integration of multiple layers for displaying content to consumer in accordance with an aspect of then invention.

FIG. 4 illustrates layers integrated together to form a multi-layered content for display in the content-scalable dynamic content module 302. In one illustrative embodiment, layers of integration include three main layers. A first picture layer 402 includes an image of a product 408. The picture layer 402 may be a bitmap of an image 408 obtained from the item catalog data store 122. In one illustrative embodiment, the picture layer 402 may be accompanied with a background layer 416 to complement picture layer 402. The transparency layer 404 includes multiple sections, each section having a different degree of opacity that can be used to reduce or increase the visibility of a layer covered by the transparency layer 404. In one illustrative embodiment, the transparency layer 404 is a bitmap having multiple sections with each section increasing in opacity compared to the previous section as the transparency layer 404 is traversed from one end to the opposite end. In another illustrative embodiment, the transparency layer 404 may include opacity 410 which continuously and gradually increases from one end of the transparency layer to the opposite end, without any discrete sections. A third layer includes a text layer 406 including textual content 412. Typically, the textual content 412 is a description or other information, such as brand name and price, of the image 408 included in the picture layer 402. The content of content-scalable dynamic content module 302 visually appears as a single image formed from the overlapping of the three layers 402, 404, and 406, but is not actually compressed into a single image. When the content-scalable dynamic content module 302 adjusts itself to fit an allocated display area, the amount of information contained therein is reduced to accommodate the smaller display area, as shown in FIG. 3C. The multi-layered content of the content-scalable dynamic content module 302 is used to reduce the amount of information displayed. Specifically, with reference to FIG. 3C, the description 342 included in the text layer 406 as textual content 412 will overlap the item picture 340 as included in the picture layer 402 in the form of the image 408, as a result of the reduction of information in the content-scalable dynamic content module 302.

The transparency layer 404 is used to obscure part of the image 408 in picture layer 402 and allow the textual content 412 included in the text layer 406 to be clearly visible. Different sections of the transparency layer 404, having different degrees of opacity 410, may be used to cover the image 408 included in picture layer 402, resulting in a semi-transparent text layer 406 and making the image 408 visible as a ghost image. Those skilled in the art will appreciate that different transparency techniques may be used to combine the text layer 406 with the picture layer 402 making the textual description 412 legible at the same time that the image 408 is visible, without departing from the spirit of the present disclosures. For example, alpha-blending may be used dynamically to achieve the same result. In alpha blending, scalar quantities are calculated and applied to the text layer to make the text layer transparent to a prescribed extent and make layers underneath the text layer visible as ghost images. Hence, the multi-layered content of the content-scalable dynamic content module 302 enables the content-scalable dynamic content module to adjust its size to the allocated display area without obscuring important information such as the item image 304 and/or the description 310. Those skilled in the art will appreciate that other layers of information may be included in the multi-layered content described above. For example, a video layer for showing animation and/or film segments, a branding layer for prominently displaying a brand or trade dress, as well as other layers for other purposes, may be included in the multi-layered content.

Figure 5:
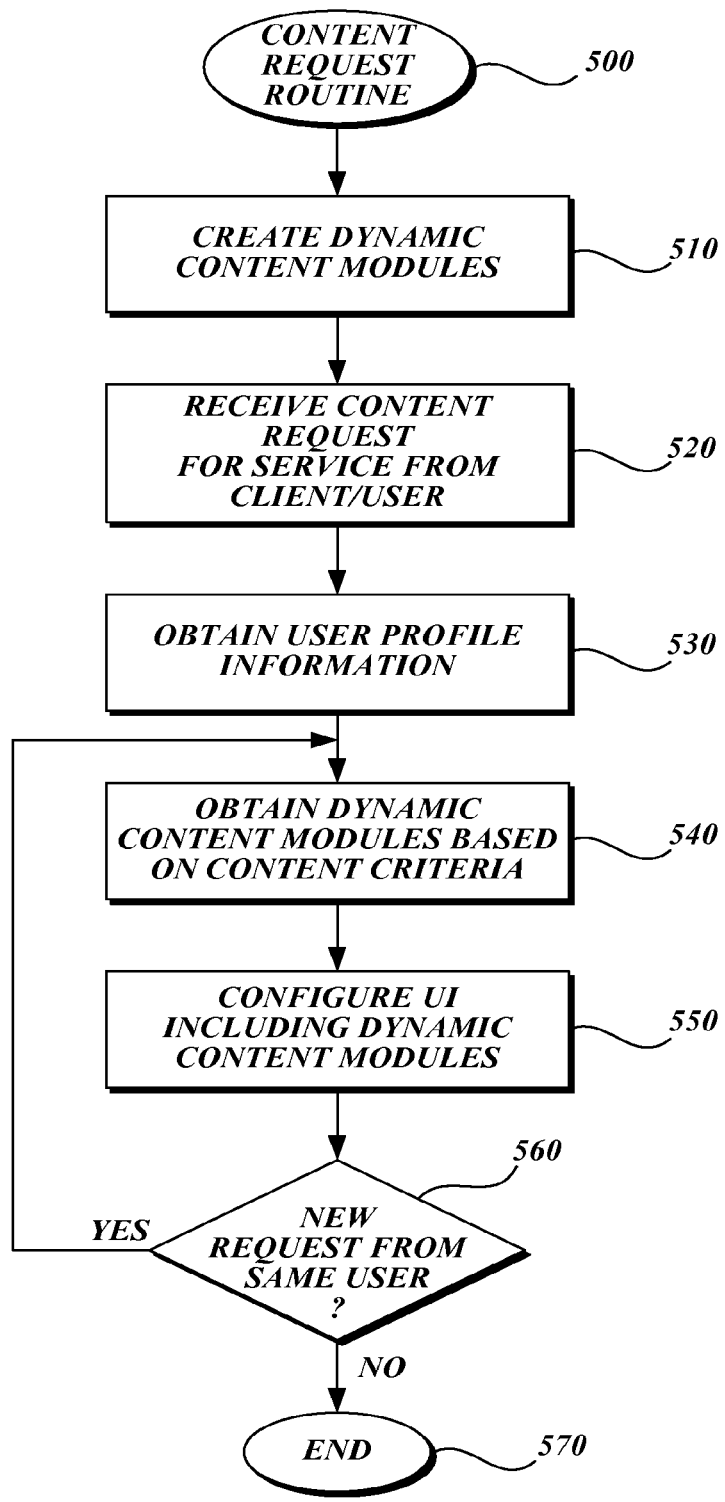
FIG. 5 is a flow diagram depicting an illustrative method of client content request and service provider response utilizing content-scalable dynamic content modules.

FIG. 5 illustrates a flow diagram depicting an illustrative method for client content request and service provider response thereto. Starting with block 500, the method proceeds to block 510 where the client computing device 102 sends a content request to the service provider 108. In one illustrative embodiment, the client device 102 uses a browser 104 and Web protocols, such as HTTP, to send the content request to the service provider 108. At block 520, the service provider 108 receives the content request from the browser 104 through Internet 106. At block 530, the user profile manager 114 included in the server device 110 retrieves user profile information from the user profile data store 120. In one illustrative embodiment, the user profile information includes recent purchases by the user, category of products to which such purchases belong, demographic information about the user, such as age and income, geographic area where the user resides, etc. The user profile manager 114 provides the retrieved user information to the content module manager 116. The content module manager 116 uses the user profile information to retrieve a number of content-scalable dynamic content modules from the dynamic content module data store 118. In one illustrative embodiment, dynamic content modules data store 118 includes preconfigured content-scalable dynamic content modules created based on information in the item catalog data store 122 and user profile data store 120. A particular user profile may be associated with a large number of such preconfigured content-scalable dynamic content modules stored in the dynamic content modules data store 118. The content module manager 116 retrieves a subset of the content-scalable dynamic content modules associated with the particular user profile for display on the client device 102. At block 550, the service provider 108 returns the selected retrieved content-scalable dynamic content modules via network 106 to the browser 104 for display. Those skilled in the art will appreciate that other user interfaces may be used instead of a browser without departing from the spirit of the present disclosures. At decision block 560, the method determines whether a new request from the same user has been obtained. If a new request from the same user has been obtained by the service provider 108, the method proceeds back to block 540 where appropriate content-scalable dynamic content modules are retrieved from the dynamic content modules data store 118 and returned to the client device 102. Otherwise, the routine terminates at block 570.

Figure 6:
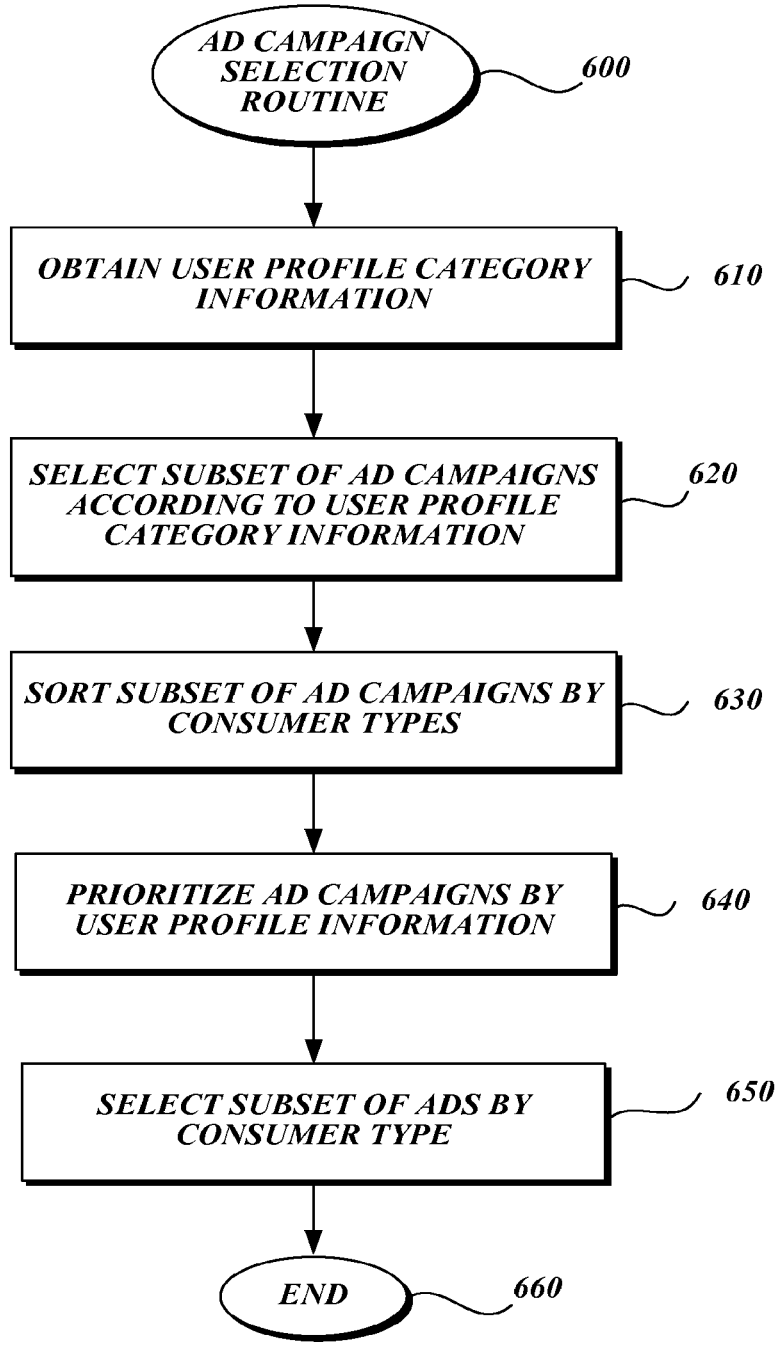
FIG. 6 is a flow diagram depicting an illustrative method for selecting advertisement campaigns according to consumer types.

With reference now to FIG. 6, a routine 600 for selecting advertisement campaigns utilizing consumer type information will be described. At block 602, the ad campaign manager 126 obtains user profile information from the user profile data store 120. In an illustrative embodiment, the user profile information can include information of item categories of interest to a particular user. The item category information may be explicitly provided as part of the user profile information or determined from the user profile information by the ad campaign manager 126. For example, the user profile information may indicate that a particular user is interested in electronic items, houseware items and sporting goods items. The item categories can correspond to pre-existing categories, or a subset of categories utilized by the service provider 108. Alternatively, the categories may be expressly selected for use in selecting advertisement campaigns.

At block 620, the ad campaign manager 126 selects a subset of advertisement campaigns from the ad campaign data store 124 that are applicable to the selected item category information. In an illustrative embodiment, each advertisement campaign in the ad campaign data store 126 can include information identifying applicable item categories. The specified applicable item categories may be part of explicit selection criteria for each advertisement campaign. Alternatively, the applicable item categories may be specified separately for each advertisement campaign or inferred from other data associated with the advertisement campaign.

At block 630, the ad campaign manager 126 sorts the subset of advertisement campaigns according to their potential applicability to consumer categories. As mentioned above, the service provider 108 can define a variety of consumer types that relate to interests, traits, histories, and other consumer behaviors. Examples included, but are not limited to, early technology adopters, bargain hunters, rebate hunters, and the like. In an illustrative embodiment, the ad campaign manager 126 sorts the subset of advertisement campaigns according to applicability to one or more consumer types. For example, the ad campaign manager 126 could identify from the subset of advertisement campaigns all the advertisement campaigns that relate to, or are applicable to, early adopters, bargain hunters, rebate hunters, etc. In one embodiment, each advertisement campaign can include information identifying one or more consumer types to which the particular advertisement campaign may apply. Alternatively, the ad campaign manager 126 can process information within the advertisement campaign, such as special offers, prices, release dates, etc. to assess what type of consumer type may be interested in the advertisement campaign. In an illustrative embodiment, a particular advertisement campaign may apply to multiple consumer types. Alternatively, the ad campaign manager 126 may select only a consumer type that is most applicable to each advertisement campaign.

At block 640, the ad campaign manager 126 can then prioritize the sorted subset of advertisement campaigns according to user profile information. In an illustrative embodiment, the ad campaign manager 126 can maintain a list of advertisement campaigns that may be applicable to a set of consumer types. The ad campaign manager 126 can prioritize the list according to preferences or characteristics from the user profile information. For example, assume an advertisement campaign includes an advertisement campaign for two competing electronic media player products and that the ad campaign manager 126 determines both advertisement campaigns are applicable to an "early adopter" consumer type. The ad campaign manager 126 can prioritize the advertisement campaigns according to the user profile information to determine which of the two the user may prefer. Thus, if the user profile information indicates that the user has placed one of the competing products in a wish list, the ad campaign manager 126 would prioritize this advertisement campaign. One skilled in the relevant art will appreciate that the ad campaign manager 126 can utilize anyone of a variety of product matching or product recommendation algorithms to prioritize the list of advertisement campaigns.

At block 650, the ad campaign manager 126 or content module manager 116 can select one or more advertisement campaigns for display to a user. In accordance with an illustrative embodiment, the content module manager 116 can select dynamic content modules from the dynamic content modules data store 118 according to the prioritized advertisement campaigns. Alternatively, the ad campaign manager 126 can select non-dynamic content module advertisements in another embodiment. At block 660, the routine 600 terminates.

While illustrative embodiments have been illustrated and described, it will be appreciated that various changes can be made therein without departing from the spirit and scope of the invention.

What is claimed is:

1. A computer-implemented method for displaying content, the method comprising:
obtaining a content-scalable dynamic content module based, at least in part, on a content request associated with a user, wherein the content-scalable dynamic content module comprises a plurality of layers presenting content corresponding to the content request; and
transmitting the content-scalable dynamic content module to a user device associated with the user wherein the content of the content-scalable dynamic content module is displayed in a display area of the user device, wherein an amount of the content displayed is dynamically determined on the user device at a time the content is rendered and based, at least in part, on a relative position of two or more overlapping layers of the plurality of layers, and wherein the relative position is determined based, at least in part, on a size of the display area of the user device.

2. The computer-implemented method of claim 1, wherein the content-scalable dynamic content module further comprises display rules for displaying individual layers of the plurality of layers on the user device.

3. The computer-implemented method of claim 2, wherein the content-scalable dynamic content module further comprises executable code corresponding to the display rules.

4. The computer-implemented method of claim 2, wherein the display rules are evaluated on the user device at the time the content is rendered.

5. The computer-implemented method of claim 1, wherein the size of the display area is dependent, at least in part, on other content displayed on the user device.

6. The computer-implemented method of claim 1, wherein the plurality of layers include at least one of a text layer, transparency layer, image layer, or background layer.

7. The computer-implemented method of claim 6, wherein the text layer is positioned on top of the transparency layer and the transparency layer is positioned on top of the image layer when rendered for display on the user device.

8. The computer-implemented method of claim 6, wherein the transparency layer comprises a plurality of transparency sections, each transparency section having a different opacity.

9. The computer-implemented method of claim 6, wherein the transparency layer includes opacity that continuously and gradually increases from one end of the transparency layer to an opposite end of the transparency layer.

10. A system comprising:
a data store configured to at least store computer-executable instructions; and
a hardware processor in communication with the data store, the hardware processor configured to execute the computer-executable instructions to at least:

obtain a content-scalable dynamic content module based, at least in part, on a content request associated with a user, wherein the content-scalable dynamic content module comprises a plurality of layers presenting content corresponding to the content request; and transmit the content-scalable dynamic content module to a user device associated with the user wherein the content of the content-scalable dynamic content module is displayed in a display area of the user device, wherein an amount of the content displayed is dynamically determined on the user device at a time the content is rendered and based, at least in part, on a relative position of respective portions of content included in two or more overlapping layers of the plurality of layers, and wherein the relative position of the respective portions of content is determined based, at least in part, on a size of the display area of the user device.

11. The system of claim 10, wherein the content-scalable dynamic content module is created based on a template.

12. The system of claim 10, wherein the content-scalable dynamic content module includes executable code.

13. The system of claim 12, wherein the executable code is executed on the user device to obtain display rules for displaying individual layers of the plurality of layers on the user device.

14. The system of claim 10, wherein the hardware processor is further configured to transmit to the user device display rules for displaying individual layers of the plurality of layers on the user device.

15. The system of claim 10, wherein the content of the content-scalable dynamic content module includes advertisement related to the content request associated with the user.

16. A non-transitory computer readable storage medium storing computer executable instructions that when executed by a processor perform operations comprising:

obtaining a content-scalable dynamic content module based, at least in part, on a content request associated with a user, wherein the content-scalable dynamic content module comprises a plurality of layers presenting content corresponding to the content request;

transmitting the content-scalable dynamic content module to a user device associated with the user; and causing displaying, in a display area of the user device, at least a portion of the content of the content-scalable dynamic content module, wherein an amount of the content displayed is dynamically determined on the user device at a time the at least a portion of the content is rendered and based, at least in part, on a relative position of respective content elements included in two or more overlapping layers of the plurality of layers, and wherein the relative position of the respective content elements is determined based, at least in part, on a size of the display area of the user device.

17. The non-transitory computer readable storage medium of claim 16, wherein the operations further comprise causing evaluation of display rules for displaying individual layers of the plurality of layers on the user device at the time the content is rendered.

18. The non-transitory computer readable storage medium of claim 16, wherein the size of the display area is dependent, at least in part, on other content displayed on the user device.

19. The non-transitory computer readable storage medium of claim 16, wherein the plurality of layers include at least one of a text layer, transparency layer, image layer, or background layer.

20. The non-transitory computer readable storage medium of claim 16, wherein the operations further comprise generating the content-scalable dynamic content module at a time of receiving the content request.

* * * * *